(12) United States Patent
Mabuchi et al.

(10) Patent No.: US 10,484,605 B2
(45) Date of Patent: Nov. 19, 2019

(54) ELECTRONIC DIAL APPARATUS AND ELECTRONIC APPARATUS

(71) Applicant: CANON KABUSHIKI KAISHA, Tokyo (JP)

(72) Inventors: Toshikazu Mabuchi, Kawasaki (JP); Yusuke Kikuchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/924,950

(22) Filed: Mar. 19, 2018

(65) Prior Publication Data
US 2018/0278842 A1    Sep. 27, 2018

(30) Foreign Application Priority Data

Mar. 22, 2017 (JP) .................................. 2017-056292

(51) Int. Cl.
| | |
|---|---|
| *H04N 5/232* | (2006.01) |
| *H04N 5/225* | (2006.01) |
| *H01H 19/00* | (2006.01) |
| *G02B 7/14* | (2006.01) |
| *G02B 7/10* | (2006.01) |
| *G05G 5/06* | (2006.01) |
| *H01H 19/11* | (2006.01) |
| *H01H 19/60* | (2006.01) |
| *G05G 1/01* | (2008.04) |
| *G05G 1/10* | (2006.01) |

(52) U.S. Cl.
CPC .......... *H04N 5/23245* (2013.01); *G02B 7/10* (2013.01); *G02B 7/14* (2013.01); *G05G 5/06* (2013.01); *G05G 5/065* (2013.01); *H04N 5/2251* (2013.01); *G03B 2217/002* (2013.01); *G05G 1/01* (2013.01); *G05G 1/10* (2013.01); *H01H 19/001* (2013.01); *H01H 19/11* (2013.01); *H01H 19/60* (2013.01)

(58) Field of Classification Search
None
See application file for complete search history.

(56) References Cited

U.S. PATENT DOCUMENTS 4,777,483 A * 10/1988 Fowler ................. G05B 19/104
200/11 DA

FOREIGN PATENT DOCUMENTS

JP           2006-250566 A    9/2006

* cited by examiner

*Primary Examiner* — Mark T Monk
(74) *Attorney, Agent, or Firm* — Cowan, Liebowitz & Latman, P.C.

(57) ABSTRACT

An electronic dial apparatus includes a rotating operation member, a conductive member rotating with the rotating operation member, a conductive pattern having a plurality of conductive areas electrically insulated from one another, the conductive member being configured to slidably contact the conductive pattern as the rotating operation member rotates, and a mode setter that sets a plurality of modes in accordance with a set position of the rotating operation member. The mode setter sets one of the plurality of modes based on a combination of a plurality of signal levels that depend on a contact position between the conductive member and the conductive pattern. The mode setter sets at least one of the plurality of modes for two combinations of the plurality of signal levels different from all combinations of the plurality of signal levels corresponding to each set position of the rotating operation member.

20 Claims, 9 Drawing Sheets

| POSITION | MODE | CODE NO. | SIGNAL 1 | SIGNAL 2 | SIGNAL 3 | SIGNAL 4 |
|---|---|---|---|---|---|---|
| P1 | A | C1 | H | H | H | H |
| P2 | B | C2 | L | H | H | H |
| P3 | C | C3 | L | H | H | L |
| P4 | D | C4 | L | L | H | L |
| P5 | E | C5 | L | L | H | H |
| P6 | F | C6 | H | L | H | H |
| P7 | G | C7 | H | L | L | H |
| P8 | H | C8 | H | L | L | L |
| P9 | I | C9 | H | H | L | L |
| NOTHING | I | C10 | H | H | L | H |
| NOTHING | I | C11 | H | H | H | L |

| POSITION | MODE | CODE NO. | SIGNAL 1 | SIGNAL 2 | SIGNAL 3 | SIGNAL 4 |
|---|---|---|---|---|---|---|
| P1 | A | C1 | H | H | H | H |
| P2 | B | C2 | L | H | H | H |
| P3 | C | C3 | L | H | H | L |
| P4 | D | C4 | L | L | H | L |
| P5 | E | C5 | L | L | H | H |
| P6 | F | C6 | H | L | H | H |
| P7 | G | C7 | H | L | L | H |
| P8 | H | C8 | H | L | L | L |
| P9 | I | C9 | H | H | L | L |
| NOTHING | I | C10 | H | H | L | H |
| NOTHING | I | C11 | H | H | H | L |

ORDER (5)

| POSITION | MODE | CODE NO. | SIGNAL 1 | SIGNAL 2 | SIGNAL 3 | SIGNAL 4 |
|---|---|---|---|---|---|---|
| P1 | A | C1 | H | H | H | H |

| NOTHING | I | C10 | H | H | L | H |

| P9 | I | C9 | H | H | L | L |

ORDER (6)

| POSITION | MODE | CODE NO. | SIGNAL 1 | SIGNAL 2 | SIGNAL 3 | SIGNAL 4 |
|---|---|---|---|---|---|---|
| P1 | A | C1 | H | H | H | H |

| NOTHING | I | C11 | H | H | H | L |

| P9 | I | C9 | H | H | L | L |

| POSITION | MODE | CODE NO. | SIGNAL 1 | SIGNAL 2 | SIGNAL 3 | SIGNAL 4 |
|---|---|---|---|---|---|---|
| P1 | A | C1 | H | H | H | H |
| P2 | B | C2 | H | L | H | H |
| P3 | C | C3 | H | L | L | H |
| P4 | D | C4 | H | H | L | H |
| P5 | E | C5 | H | H | L | L |
| P6 | F | C6 | L | H | L | L |
| P7 | G | C7 | L | H | H | L |
| P8 | H | C8 | L | H | H | H |
| P9 | I | C9 | L | H | L | H |

FIG. 10

ORDER (3)

| POSITION | MODE | CODE NO. | SIGNAL 1 | SIGNAL 2 | SIGNAL 3 | SIGNAL 4 |
|---|---|---|---|---|---|---|
| P9 | I | C9 | L | H | L | H |

| P4 | D | C4 | H | H | L | H |

| P1 | A | C1 | H | H | H | H |

ORDER (4)

| POSITION | MODE | CODE NO. | SIGNAL 1 | SIGNAL 2 | SIGNAL 3 | SIGNAL 4 |
|---|---|---|---|---|---|---|
| P9 | I | C9 | L | H | L | H |

| P8 | H | C8 | L | H | H | H |

| P1 | A | C1 | H | H | H | H |

FIG. 11

ELECTRONIC DIAL APPARATUS AND ELECTRONIC APPARATUS

BACKGROUND OF THE INVENTION

Field of the Invention

The present invention relates to an electronic dial apparatus mounted on an electronic apparatus, such as a digital camera.

Description of the Related Art

A conventional electronic apparatus, such as a digital camera, a video camera, and a portable information terminal, has an electronic dial apparatus configured to set an operational mode and a variety of settings. The electronic dial apparatus includes a substrate with a conductive pattern fixed onto an apparatus body, a phase segment having a flat spring shape slidable relative to the conductive pattern as a dial rotates and fixed onto the dial, a plurality of click grooves arranged in a rotating direction, and a sphere engageable these click grooves. As the dial rotates, the sphere is engaged with or disengaged from the plurality of click grooves so as to generate a click feeling in the dial rotating operation.

This dial apparatus determines a position of the dial by detecting an electrified state between the conductive pattern and the phase segment. The electronic dial apparatus may make the number of electric signals less than the number of positions by using a Gray code or a reflected binary code. The Gray code assumes a code arrangement in which only one signal level among a plurality of signals switches from "active" to "inactive" or "inactive" to "active" so as to prevent an erroneous output in moving to an adjacent position. However, the assumption is not true between partial positions when the number of positions is odd, and an erroneous output may occur in moving to the adjacent position.

For example, Japanese Patent Laid-Open No. ("JP") 2006-250566 discloses a rotary switch with a code output format that can surely solve an erroneous output problem between positions in switching. A fixed signal terminal that outputs a fixed signal can restrain the erroneous output problem.

It is a known technology to restrain an erroneous output by setting "n" (odd number) to the number of positions and "n+1" to the number of codes through a conductive pattern having two code arrangements in one of "n" (odd number) positions.

The rotary switch disclosed in JP 2006-250566 arranges fixed signals at a regular interval on a slider and thus may cause a conductive pattern to be peeled off by sliding abrasions. In order to prevent the conductive pattern from peeling off, an insulated sheet may be provided at the end of the conductive pattern, but the dial operating feeling may degrade due to a step of the insulated sheet. In addition, due to a non-contact phase between the fixed signal and the phase segment, the phase segment may temporarily be electrically floating metal and a signal may become unstable and fluctuate.

In the above reference, a code is switched at one position and the substrate has no conductive pattern or a groove. Since the groove is generated at one position having a low click load rather than at a center having a high click load between two positions, the user is likely to feel the step in the rotating operation and the operating feeling may degrade.

SUMMARY OF THE INVENTION

The present invention provides an electronic dial apparatus and an electronic apparatus, which can generate a stable signal without sacrificing an operating feeling.

An electronic dial apparatus according to one aspect of the present invention includes a rotating operation member, a conductive member configured to rotate with the rotating operation member, a conductive pattern having a plurality of conductive areas that are electrically insulated from one another, the conductive member being configured to slidably contact the conductive pattern as the rotating operation member rotates, and a mode setter configured to set a plurality of modes in accordance with a set position of the rotating operation member. The mode setter sets one of the plurality of modes based on a combination of a plurality of signal levels that depend on a contact position between the conductive member and the conductive pattern. The mode setter sets at least one of the plurality of modes for two combinations of the plurality of signal levels different from all combinations of the plurality of signal levels corresponding to each set position of the rotating operation member.

The electronic apparatus according to another aspect of the present invention includes the electronic dial apparatus.

Further features of the present invention will become apparent from the following description of exemplary embodiments with reference to the attached drawings.

DESCRIPTION OF THE EMBODIMENTS

A detailed description will be given of an embodiment of the present invention with reference to the accompanying drawings.

Figure 1:
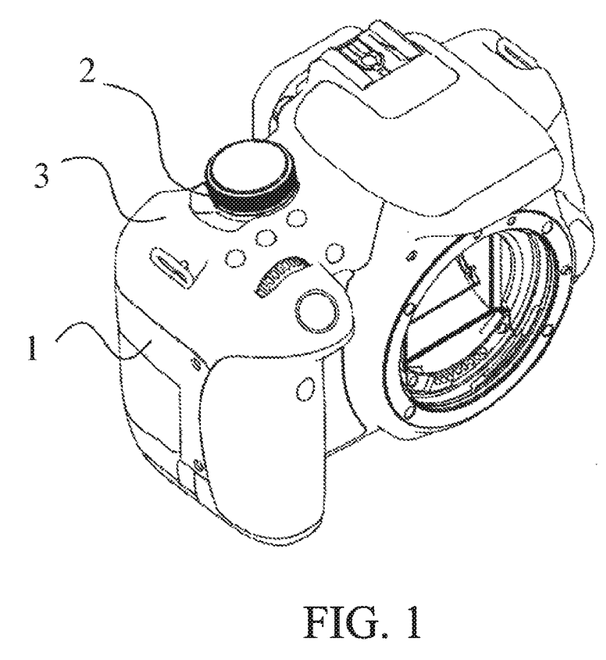
FIG. 1 is a perspective view of an image pickup apparatus according to this embodiment.

Referring now to FIG. 1, a schematic description will be given of an image pickup apparatus according to this embodiment. FIG. 1 is a perspective view of an image pickup apparatus (digital single-lens reflex camera) 1. A mode dial (rotating operation member) 2 configured to set a variety of image pickup conditions for image pickup is provided on a top surface of the image pickup apparatus 1. As the mode dial 2 clockwise or counterclockwise rotates in accordance with the rotating operation of the user, an image pickup mode for an image pickup condition, such as a shutter speed priority mode (Tv mode) and an F-number priority mode (Av mode), can be set or selected. Reference numeral 3 is an exterior cover provided on a top surface side of the image pickup apparatus 1. This embodiment enables an unillustrated interchangeable lens (image pickup optical system) to be attached to and detached from the image pickup apparatus 1. However, this embodiment is not limited to this example, and is applicable to an image pickup apparatus in which the image pickup optical system is integrated with an image pickup apparatus body.

Figure 2:
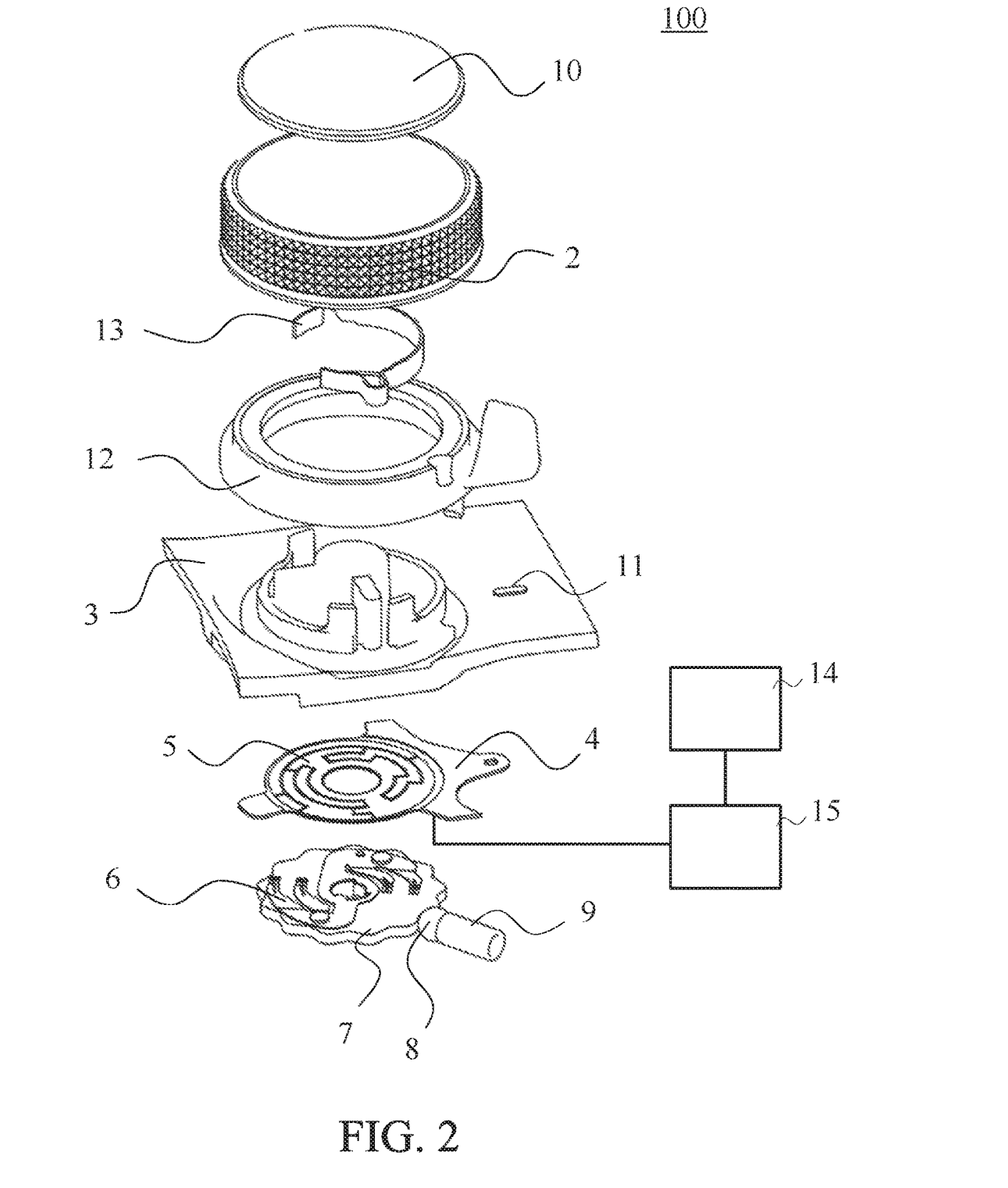
FIG. 2 is an exploded perspective view of an electronic dial apparatus according to this embodiment.

Referring now to FIG. 2, a description will be given of a structure of an electronic dial apparatus that includes the mode dial 2. FIG. 2 is an exploded perspective view of an electronic dial apparatus 100. In FIG. 2, reference numeral 4 denotes a flexible substrate (FPC, substrate), and reference numeral 5 denotes a conductive pattern provided on the flexible substrate 4. Reference numeral 6 denotes a phase segment (conductive member) that rotates with the mode dial 2, and reference numeral 7 denotes a click plate. The phase segment 6 is integrated with the click plate 7 through heat caulking. The click plate 7 has valleys as many as rotating phases of the mode dial 2, and an engagement between the valley and the click ball 8 provides a click feeling in the rotating operation of the mode dial 2. A coil spring 9 serves to force the click ball 8 against the click plate 7.

A mode dial cap 10 is bonded onto the mode dial 2, and has printed patterns as many as the rotating phases (states) of the mode dial 2. An index 11 of the exterior cover 3 indicates the pattern on the mode dial cap 10 enables the user to recognize a set or selected image pickup mode. A power lever 12 is a member used to turn on and off the power of the image pickup apparatus 1. A flat spring 13 is engaged with a valley of an inner wall surface of the power lever 12, and generates a click feeling in turning on and off the power. A storage (memory) 14 stores a code arrangement table (code table) illustrated in FIG. 6, which will be described later. A mode setter (controller) 15 can selectively set a plurality of modes (modes A to I illustrated in FIG. 6) based on the code table stored in the storage 14 and in accordance with the set position of the mode dial 2 (positions P1 to P9 illustrated in FIG. 6).

Figure 3:
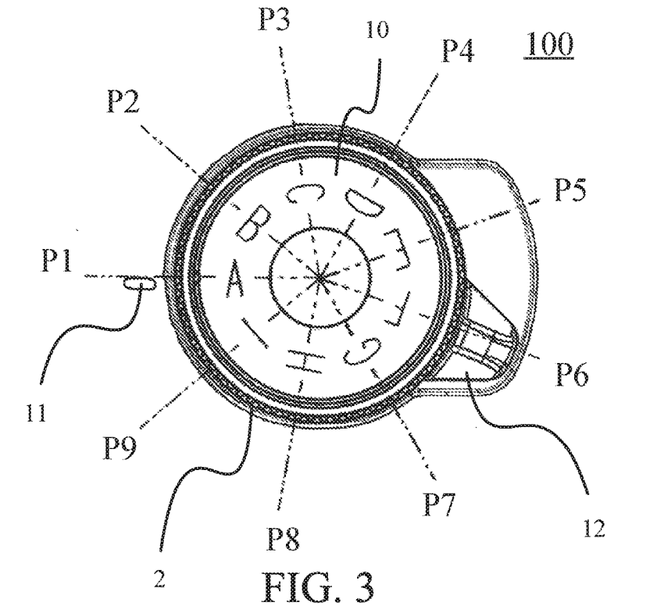
FIG. 3 is a top view of the electronic dial apparatus according to this embodiment.

Referring now to FIG. 3, a description will be given of a relationship between the rotating position of the electronic dial apparatus 100 and the mode (image pickup mode). FIG. 3 is a top view of the electronic dial apparatus 100. As illustrated in FIG. 3, in this embodiment, the mode dial cap 10 has totally nine types of modes ("A," "B," "C," "D," "E," "F," "G," "H," and "I") corresponding to the positions (set positions) P1 to P9 of the mode dial 2. In this embodiment, the positions P1 to P9 correspond to image pickup modes as the modes A to I arranged at intervals of rotating angle of 40 degrees.

The user rotates the mode dial 2, and freely switches the nine types of image pickup modes. This embodiment does not provide a rotating end to the mode dial 2, which prevents the mode dial 2 from further clockwise or counterclockwise rotating. Thus, the user can continue to rotate the mode dial 2 in each of the clockwise and counterclockwise rotating directions.

Figure 4:
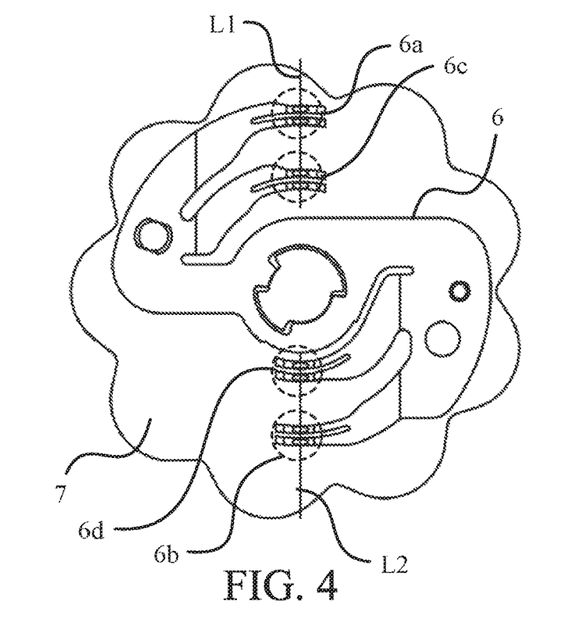
FIG. 4 is a top view of a phase segment according to this embodiment.

Referring now to FIG. 4, a description will be given of a structure of the phase segment (conductive member) 6 in this embodiment. FIG. 4 is a top view of the phase segment 6. As illustrated in FIG. 4, the phase segment 6 is made of a conductive material having an elastic shape, and the tips of the phase segment 6 have contacts 6a, 6b, 6c, and 6d with the conductive pattern 5. Distances from the rotating center of the mode dial 2 to the contacts 6a, 6b, 6c, and 6d are different from one another, and rotating loci of the four contacts 6a to 6d do not overlap one another. The contacts 6a to 6d are pressed against the conductive pattern 5 of the flexible substrate 4 with a predetermined load for electrically stable connections with the flexible substrate 4. Each of all contacts 6a to 6d has two divided contacts. This is because even when one of the divided contacts is disconnected from the conductive pattern 5 due to foreign particles, such as dust, the other divided contact can maintain the conductive state. A line L1 that connects the contact 6a with the contact 6c, and a line L2 that connects the contact 6b with the contact 6d are set so as to pass the rotating center of the mode dial 2. The lines L1 and L2 are set opposite to each other with respect to the rotating center of the mode dial 2. This is because a balance of the contact pressure load around the rotating center of the mode dial 2 can restrain the phase segment 6 from inclining and a bad feeling when the user rotates the mode dial 2.

Figure 5:
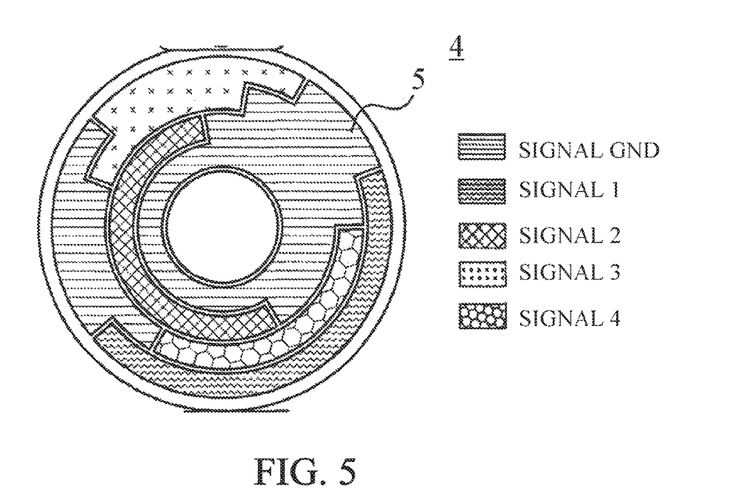
FIG. 5 is a top view of a flexible substrate having a conductive pattern according to this embodiment.

Referring now to FIG. 5, a description will be given of the flexible substrate 4 having the conductive pattern 5. FIG. 5 is a top view of the flexible substrate 4 having the conductive pattern 5. The conductive pattern 5 has signal areas (a plurality of conductive areas) that are isolated from one another and slidably connected to the phase segment 6 as the mode dial 2 rotates.

The conductive pattern 5 contains five signal areas (a plurality of conductive areas) that are isolated from one another. One of the five signal areas is a reference potential signal (grounded or GND signal) area. The GND signal can be electrically connected to the rest of four signal areas (conductive areas) via the phase segment 6. This embodiment can switch to "active" or "inactive" each of four signal potentials (a plurality of signal levels) in accordance with the rotating phase (rotating position) of the mode dial 2 depending on the position of the phase segment 6. The active state is a state (first state) in which the signal has a high level (H level) or indicates "1" and the inactive state is a state (second state) in which the signal has a low level (L level) or indicates "0."

Where the mode dial 2 provides n modes, it is conceivable that the conductive pattern 5 (a plurality of conductive areas) has a combination of n types of signal levels. Then, the area of the conductive pattern 5 increases with n modes, causing an increased size of the mode dial 2 and finally the entire product, such as the image pickup apparatus 1. Hence, a Gray code that can reduce the number of signals is used by converting the number of modes n into a combination of the signal levels "0" (low) and "1" (high) or a binary number. 1 in the binary number is replaced with a signal potential "high" and 0 is replaced with a signal potential "low." The Gray code has a rule in which only one of the plurality of signals always changes a signal level in moving to an adjacent code. In the description of the code (signal level), "H" (H level) indicates the signal potential "high" and "L" (L level) indicates the signal potential "low." The code arrangement (a combination of a plurality of signal levels) will be described as "signal 1, signal 2, signal 3 and signal 4" in this order.

Figure 9A:
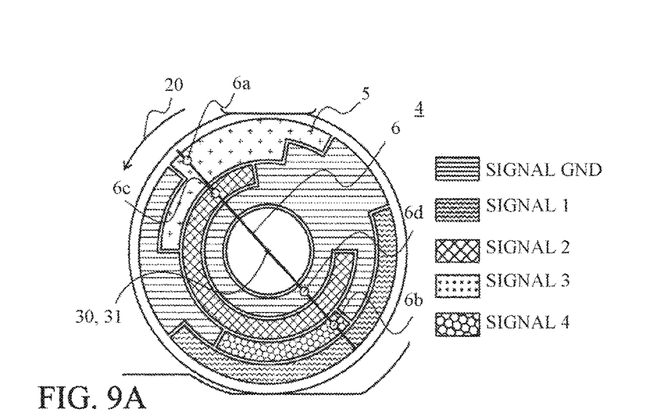
FIGS. 9A to 9C are top views of a flexible substrate having a conductive pattern as a comparative example.
Figure 9B:
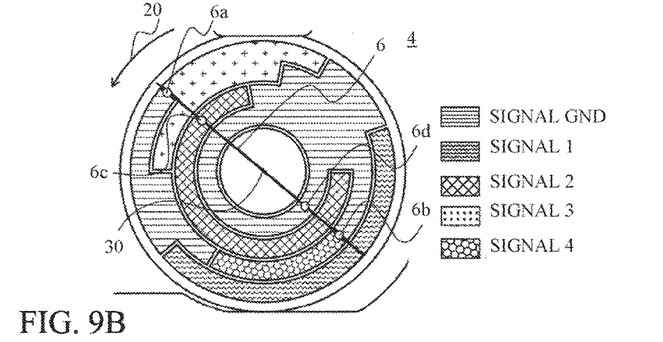
Figure 9C:
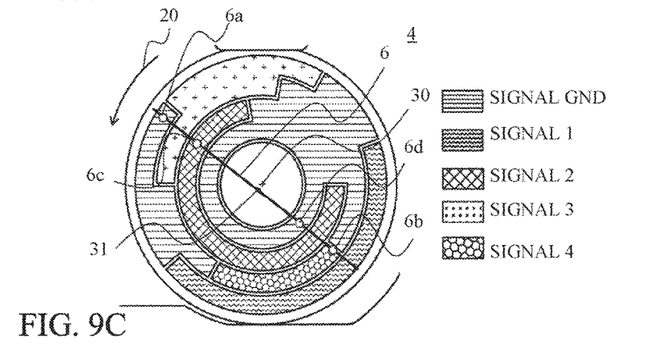

Each of FIGS. 9A, 9B, and 9C is a plane view of a flexible substrate as a comparative example having a conductive pattern that is not pursuant to the Gray code rule. Since the contact 6d is connected to the conductive area of the GND signal (conductive area for outputting the signal GND), the signal level is low for the conductive area that contacts the remaining contacts 6a, 6b, and 6c. FIG. 9A illustrates that the phase segment 6 rotates in a counterclockwise rotating direction 20 around a rotating center 31 as an axis from a code "HLLL" (combination of a plurality of signal levels), and is about to move to the conductive area with a code "HLHH." More specifically, FIG. 9A illustrates that the signal 3 that contacts a conductive area (third conductive area) that contacts the contact 6a changes from L to H and the signal 4 that contacts a conductive area (fourth conductive area) that contacts the contact 6b changes from L to H, and these two signals simultaneously change.

FIG. 9B illustrates that the phase segment 6 rotates in the rotating direction 20 and has just moved to the conductive area with a code "HLHH" when each shape of the conductive pattern 5 and the phase segment 6 accords with a designed value and a center 30 of the conductive pattern 5 accords with the rotating center 31 of the phase segment 6. When the above conditions are satisfied, two signals of the "signal 3" and the "signal 4" can be simultaneously changed in the strict meaning. However, the above conditions are unlikely to be satisfied based on the component shape and the assembly scattering, and the signal mostly changes one by one in order. There are two changing ways:

"HLLL"→"HLLH"→"HLHH" . . . order (1)
"HLLL"→"HLHL"→"HLHH" . . . order (2)

FIG. 9C illustrates that the center 30 of the conductive pattern 5 shifts from the rotating center 31 of the phase segment 6 and shows "HLHL" in the order (2) in the movement from "HLLL" to "HLHH." Each of "HLLH" in the order (1) and "HLHL" in the order (2) is an unintended and unnecessary code in the mode setting.

The Gray code must keep the rule in which only one signal necessarily changes in moving to the adjacent code, as described above. However, as in the dial explained in this embodiment, the dial having n (odd number) positions (or modes) and no rotating end has inevitably a point that breaks the Gray code rule.

The dial having no rotating end provides a movement between the position P1 and the position P9 in addition to a movement between adjacent positions, such as a movement between the position P1 and the position P2. Therefore, codes located on the positions P1 and P9 correspond to codes adjacent to each other. When one signal is changed from H to L, for example, in the movement to the adjacent signal in the dial having no rotating end, it is necessary to change that signal from L to H while the dial is continued to rotate in the same rotating direction and to change to the same position again. In other words, at least two changes are necessary from H to L and from L to H, this is applied to all signals, and thus the code changing number must be even. When the number of positions n (the number of set positions in the mode dial 2) corresponding to the number of modes is even, the number of code changes is (n−1) when the dial is rotated from the position P1 to the position Pn. When the mode dial 2 has no rotating end, the code changes once between the position P1 and the position Pn. In other words, the code changing number is totally n. Since the code changing number is necessarily even, the code arrangement that keeps the Gray code rule can be set.

On the other hand, when the number of positions n (the number of set positions) corresponding to the number of modes is odd, the number of code changes from the position P1 to the position Pn is (n−1) (even number). When the mode dial 2 has no rotating end, once or one code change is added for a movement from the position P1 to the position Pn and the code changing number is totally n (odd number). In other words, the number of code changes is always odd and there is inevitably one point that breaks the Gray code rule.

Figure 10:
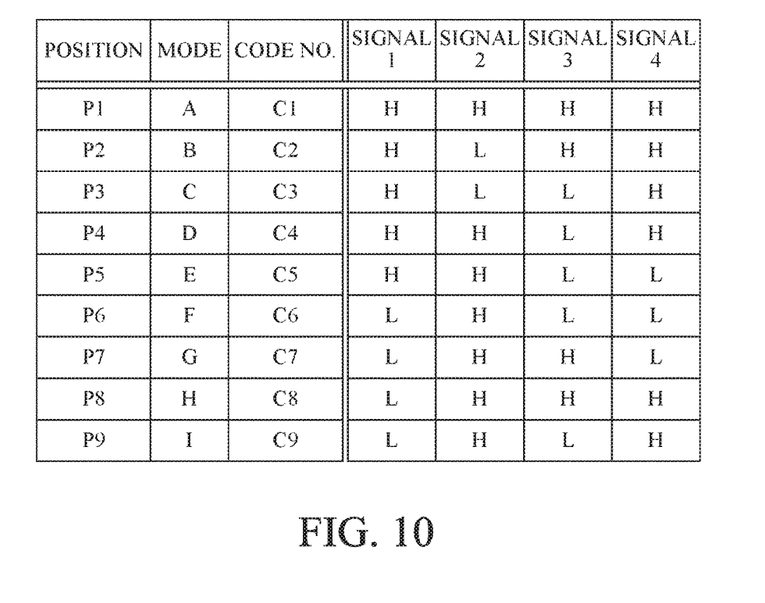
FIG. 10 is a code arrangement table as a comparative pattern.

FIG. 10 illustrates a Gray code arrangement table as a comparative example with nine positions. As described above, the Gray code rule is not kept for the odd number of positions (or modes). Assume that the user rotates the mode dial so as to change the position P9 corresponding to the mode I to the position P1 corresponding to the mode A. In this case, two signals are unlikely to simultaneously change and the signal changes one by one in order. There are two orders.

Figure 11:
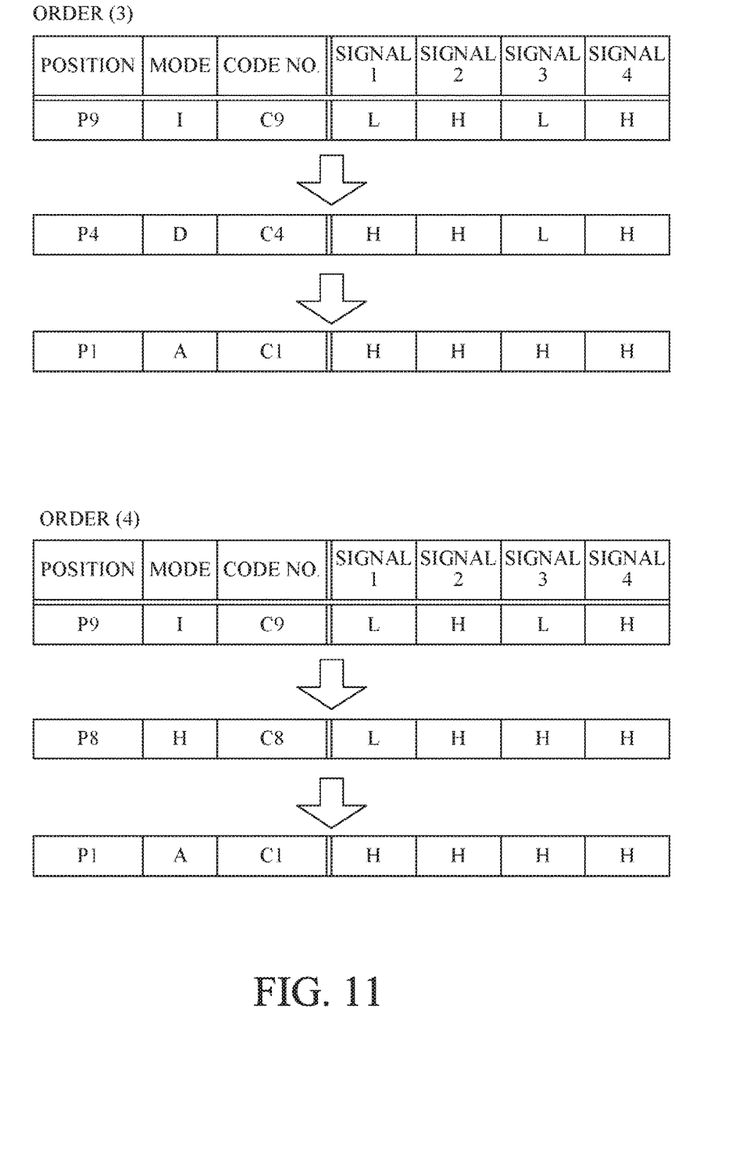
FIG. 11 illustrates a signal changing order when a mode dial is rotated from a position P1 to a position P9 in a code arrangement illustrated in FIG. 10.

FIG. 11 illustrates the signal changing order when the mode dial 2 is changed from the position P9 to the position P1 in the code arrangement illustrated in FIG. 10. As illustrate in FIG. 11, an order (3) passes a mode D assigned to the position P4, and an order (4) passes a mode H assigned to the position P8. In other words, when the user rotates the mode dial 2 so as to change from the mode A to the mode I or from the mode I to the mode A, the mode D or H may change in the operation although the user rotates the dial only by one position. In particular, when the user slowly rotates the dial or suspends rotating the dial, the user is likely to recognize the unintended mode. It is thus undesirable to change the mode unintended by the user in the rotation.

As a solution for this problem, it is conceivable that in the code arrangement illustrated in FIG. 10, for example, when the mode is changed from the mode A to the mode D, from the mode A to the mode H, from the mode I to the mode D, and from the mode A to the mode H, the image pickup apparatus 1 ignores these changes. However, when the user actually tries to quickly rotate the mode dial 2 so as to switch the mode A to the mode D, a new problem occurs in which the image pickup apparatus 1 may ignore the mode change. A description will now be given of this embodiment that solves a problem peculiar to the mode dial having the odd number of positions.

Figure 6:
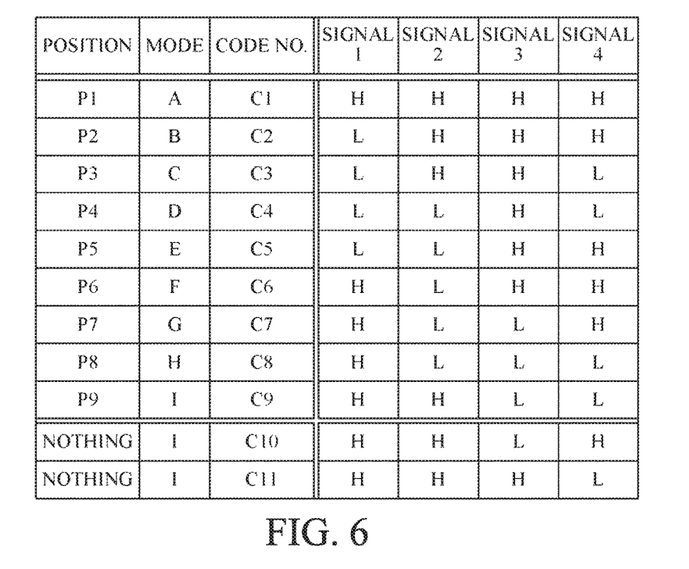
FIG. 6 is a code arrangement table according to this embodiment.

Referring to FIG. 6, a description will be given of the code arrangement table in this embodiment. FIG. 6 illustrates a code arrangement table in this embodiment which illustrates a relationship among a position, an image pickup mode, and a code in the code arrangement. As illustrated in FIG. 6, the mode dial 2 has nine positions and eleven codes corresponding to two modes in addition to nine modes corresponding to the nine positions. The eleven codes are different from one another (combinations of a plurality of signal levels are different from one another). Only one type of signal always changes in moving to the adjacent code in the codes C1 to C9 (only one signal level among the four signal areas (signals 1 to 4) changes). In addition, only one type of signal changes in the code arrangement in moving the code from the code C9 to the code C10 or the code C10 to the code C1. Similarly, only one type of signal changes in the code arrangement in moving the code from the code C9 to the code C11 or the code C11 to the code C1.

The codes C1 to C9 produce a conductive pattern, and the codes C10 and C11 do not produce the conductive pattern. Similar to the prior art, the codes C1 to C9 are assigned to the modes A to I. This embodiment additionally assigns the same mode assigned to the code C1 or C9 or the mode A or I to the codes C10 and C11. As long as the mode A or I is assigned to the code C10 or C11, the same mode (both codes C10 and C11 are assigned to the mode A or I) or different modes (one of the codes C10 and C11 is assigned to the mode A and the other of the codes C10 and C11 is assigned to the mode I) may be used. In FIG. 6, the codes C10 and C11 are assigned to the same mode I corresponding to the code C9.

Figure 7A:
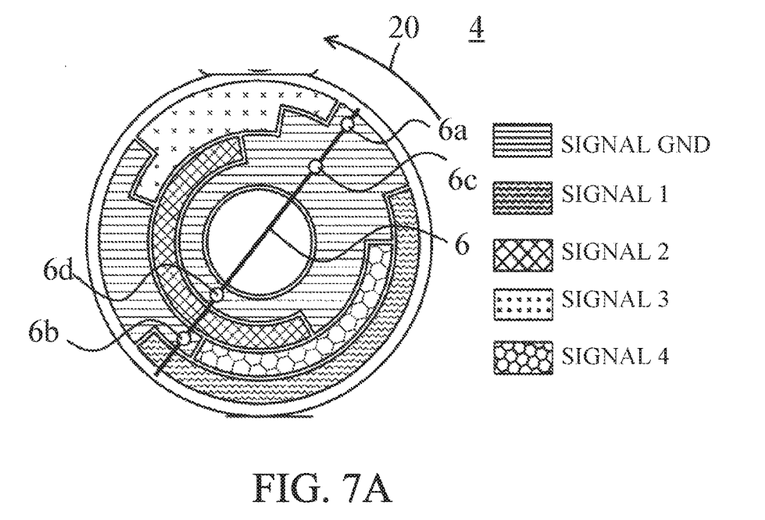
FIGS. 7A and 7B are top views of the flexible substrate having the conductive pattern according to this embodiment.
Figure 7B:
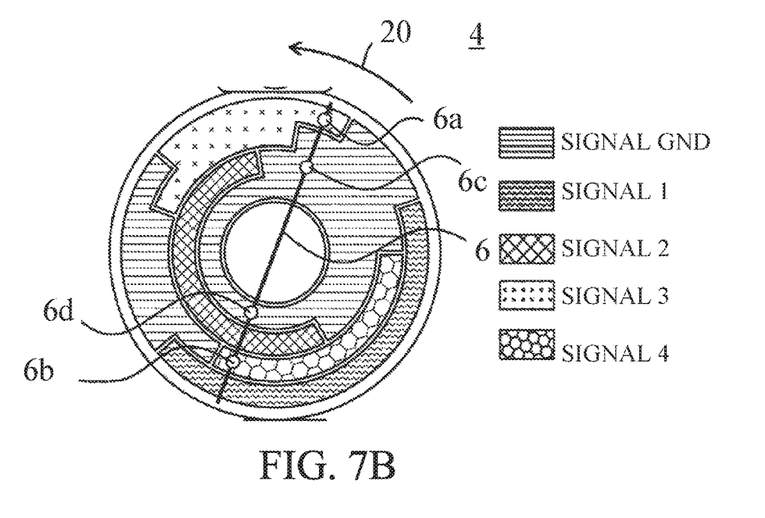

Referring now to FIGS. 7A and 7B, a description will be given of the flexible substrate 4 having the conductive pattern 5 according to this embodiment. FIGS. 7A and 7B illustrate top view of the flexible substrate 4 having the conductive pattern according to this embodiment. FIG. 7A illustrates the phase segment 6 located on the position P1, and FIG. 7B illustrates the phase segment 6 located on the position P9. The user rotates the mode dial 2 in the rotating direction 20 from the position p1 to the position P9 through changing two signal levels (signals 3 and 4 in this embodiment), and does not keep the Gray code rule.

Figure 8:
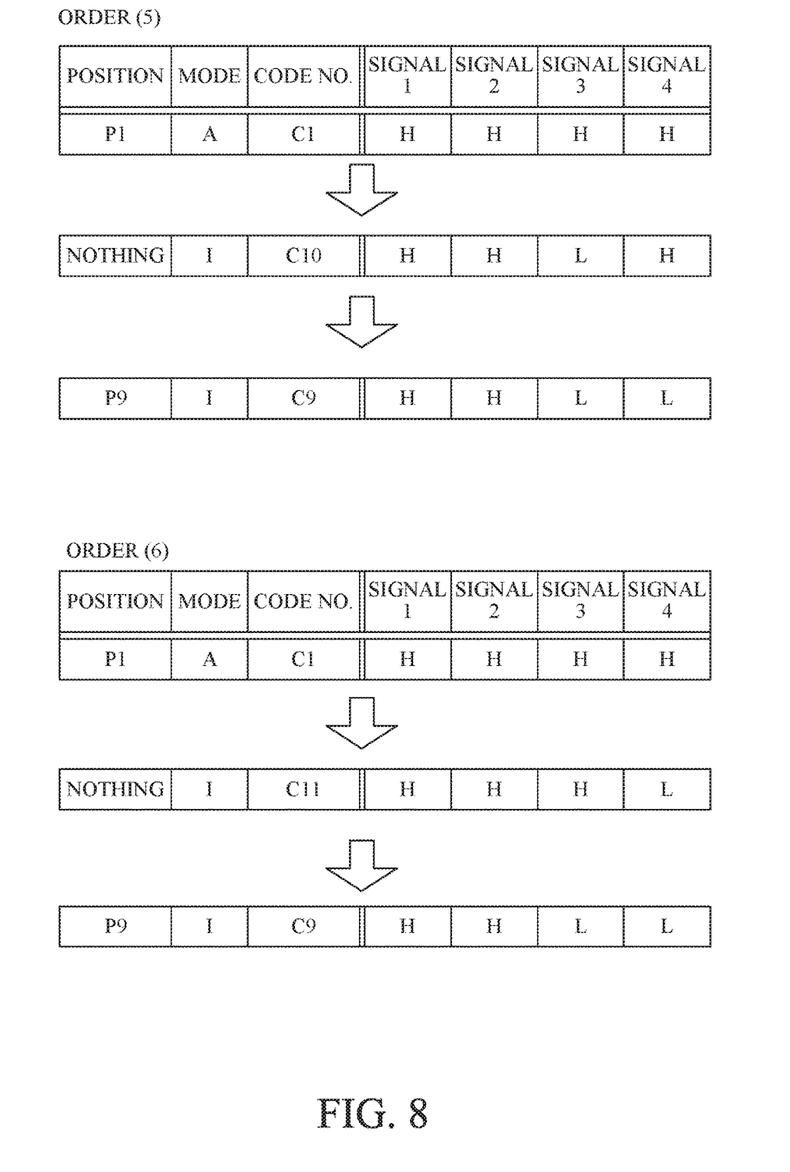
FIG. 8 illustrates a signal changing order when a mode dial 2 is rotated from a position P1 to a position P9 in a code arrangement illustrated in FIG. 6.

FIG. 8 illustrates the signal changing order when the mode dial 2 is changed from the position P1 to the position P9 in the code arrangement illustrated in FIG. 6. As illustrated in FIG. 8, an order (5) contains a combination "HHLH" of the signal levels for the code C10 and an order (6) contains a combination "HHHL" of the signal levels for the code C11. The combination "HHLH" of the signal levels for the code C10 and the combination "HHHL" of the signal levels for the code C11 are arrangements (combinations) different from the codes C1 to C9. Thus, in operating the mode dial 2, no switch occurs to the mode assigned to one of the code C1 to C9. The combination "HHLH" of the signal levels for the code C10 and the combination "HHHL" of the signal levels for the code C11 are assigned to the same mode as that for the adjacent code C9 or the mode I. Therefore, when the signal level changes in any one of the orders (5) and (6), the mode changes in order of "A," "I," and "I." A change from "I" to "I" means that the image pickup mode does not change in the image pickup apparatus 1. Hence, the user can change the mode without recognizing the intervening codes C10 and C11.

According to this embodiment, the mode setter 15 sets one of the plurality of modes based on the combinations (codes C1 to C9) of the plurality of signal levels that depend on the contact position between the conductive member (phase segment 6) and the conductive pattern 5. The mode setter 15 sets at least one (mode I) of the plurality of modes for the two combinations (C10 and C11) different from all combinations (C1 to C9) of all signal levels corresponding to the set positions (P1 to P9) of the mode dial 2. The two combinations of the plurality of signal levels may appear when the mode dial 2 is located between two specific set positions (P1 and P9) that are adjacent to each other. The signal level may be H level or L level output according to the contact state between each of the plurality of conductive areas and the conductive member.

When the set position of the mode dial 2 is a first set position (P1), the combination of the plurality of signal levels may be a first combination (C1: HHHH). When the set position changes from the first set position to a second set position (P2) adjacent to the first set position, the combination of the plurality of signal levels may be a second combination (C2: LHHH) different from the first combination only in one signal level. When the set position is at a third set position (P9) adjacent to the first set position in the direction opposite to the second set position, the combination of the signal levels may be the third combination (C9: HHLL) different from the first combination only in two signal levels. When the set position changes from the third set position to the first set position, the mode setter 15 sets at least one of the plurality of modes for the fourth and fifth combinations (HHLH and HHHL) different from each of the first and third combinations only in one signal level. For example, the fourth combination corresponds to the code C10 (HHLH), and the fifth combination corresponds to the code C11 (HHHL). The mode I or A is set to at least one of the plurality of modes. In other words, when the combination of the plurality of signal levels is the fourth or fifth combination, the mode setter 15 sets one mode set when the mode dial 2 is the first set position (P1) or the third set position (P9).

This embodiment may not use a code that makes all signal levels low or may use a code arrangement that does not use the combination "LLLL" of the signal levels. In other words, for each of all combinations of a plurality of signal levels, at least one of signal levels is the H level. This embodiment configures the five signals that include four signals and a GND signal of a substrate having a conductive pattern and four circumferences and a phase segment having four contacts. One of the contacts in any one of phases positions inevitably contacts the conductive area of the GND signal. In order to apply the code arrangement that makes all signals low, it is necessary to increase one contact and one circumference of the conductive pattern. In that case, the mode dial has a larger diameter even when the number of positions does not change. Therefore, this embodiment needs a code arrangement that includes codes more than the number of positions by two, but the code arrangement may not use a code that makes all signals low.

This embodiment describes, but is not limited to, the image pickup apparatus as the electronic apparatus having the electronic dial apparatus, and the electronic dial apparatus is applicable to the electronic apparatus other than the image pickup apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-056292, filed on Mar. 22, 2017, which is hereby incorporated by reference herein in its entirety.

What is claimed is:
1. An electronic dial apparatus comprising:
a rotating operation member;
a conductive member configured to rotate with the rotating operation member;
a conductive pattern having a plurality of conductive areas that are electrically insulated from one another, the conductive member being configured to slidably contact the conductive pattern as the rotating operation member rotates; and
a mode setter configured to set a plurality of modes in accordance with a set position of the rotating operation member,
wherein the mode setter sets one of the plurality of modes based on a combination of a plurality of signal levels that depend on a contact position between the conductive member and the conductive pattern, and
wherein the mode setter sets at least one of the plurality of modes for two combinations of the plurality of signal levels different from all combinations of the plurality of signal levels corresponding to each set position of the rotating operation member.

2. The electronic dial apparatus according to claim 1, wherein the number of set positions is odd corresponding to the number of modes.

3. The electronic dial apparatus according to claim 1, wherein the rotating operation member has no rotating end.

4. The electronic dial apparatus according to claim 1, wherein the two combinations of the plurality of signal levels appear when the rotating operation member is located between two specific set positions that are adjacent to each other.

5. The electronic dial apparatus according to claim 1, wherein the signal level is an H or L level output that depends on a contact state between each of the plurality of conductive areas and the conductive member.

6. The electronic dial apparatus according to claim 5, wherein at least one signal level among the plurality of signal levels is an H level for each combination of the plurality of signal levels.

7. The electronic dial apparatus according to claim 5, wherein the combination of the plurality of signal level is a first combination when the set position of the rotating operation member is a first set position, and
wherein the combination of the plurality of signal level is a second combination that is different from the first combination only in one signal level when the set position of the rotating operation member changes from the first set position to a second set position adjacent to the first set position.

8. The electronic dial apparatus according to claim 7, wherein the combination of the plurality of signal level is a third combination that is different from the first combination only in two signal levels when the set position of the rotating operation member changes from the first set position to a third set position adjacent to the first set position in a rotating direction opposite to the second set position with respect to the first set position, and
wherein when the set position of the rotating operation member changes from the third set position to the first set position, the mode setter sets at least one of the plurality of modes for a fourth combination and a fifth combination that are different from the first combination and the third combination only in one signal level as the two combinations of the plurality of the signal levels different from all combinations of the plurality of signal levels corresponding to the plurality of modes.

9. The electronic dial apparatus according to claim 8, wherein the mode setter sets one mode set when the rotating operation member is located at the first set position or the third set position where the combination of the plurality of signal levels is the fourth combination or the fifth combination.

10. An electronic apparatus comprising a dial apparatus, wherein the dial apparatus includes:
a rotating operation member;
a conductive member configured to rotate with the rotating operation member;
a conductive pattern having a plurality of conductive areas that are electrically insulated from one another, the conductive member being configured to slidably contact the conductive pattern as the rotating operation member rotates; and
a mode setter configured to set a plurality of modes in accordance with a set position of the rotating operation member,
wherein the mode setter sets one of the plurality of modes based on a combination of a plurality of signal levels that depend on a contact position between the conductive member and the conductive pattern, and
wherein the mode setter sets at least one of the plurality of modes for two combinations of the plurality of signal levels different from all combinations of the plurality of signal levels corresponding to each set position of the rotating operation member.

11. An electronic dial apparatus comprising:
a conductive member;
a conductive pattern having a plurality of conductive areas that are electrically insulated from one another, the conductive member being configured to slidably contact the conductive pattern as a relative position between the conductive member and the conductive pattern changes; and
a mode setter configured to set a plurality of modes in accordance with a set position of the conductive member,
wherein the mode setter sets one of the plurality of modes based on a combination of a plurality of signal levels that depend on a contact position between the conductive member and the conductive pattern,
wherein the mode setter sets two combinations of the plurality of signal levels different from all combinations of the plurality of signal levels corresponding to each set position of the conductive member,
wherein the two combinations of the plurality of signal levels appear when the conductive member is located between two specific set positions that are adjacent to each other, and
wherein modes which are set in the two combinations are the same mode as one of two modes which are set corresponding to the two specific set positions.

12. The electronic dial apparatus according to claim 11, wherein the relative position between the conductive member and the conductive pattern changes in accordance with a relative rotation between the conductive member and the conductive pattern.

13. The electronic dial apparatus according to claim 11, wherein the number of set positions is odd corresponding to the number of modes.

14. The electronic dial apparatus according to claim 11, wherein the relative rotation has no rotating end.

15. The electronic dial apparatus according to claim 11, wherein the signal level is an H or L level output that depends on a contact state between each of the plurality of conductive areas and the conductive member.

16. The electronic dial apparatus according to claim 15, wherein at least one signal level among the plurality of signal levels is an U level for each combination of the plurality of signal levels.

17. The electronic dial apparatus according to claim 15, wherein the combination of the plurality of signal level is a first combination when the set position of the conductive member is a first set position, and
wherein the combination of the plurality of signal level is a second combination that is different from the first combination only in one signal level when the set position of the conductive member changes from the first set position to a second set position adjacent to the first set position.

18. The electronic dial apparatus according to claim 17, wherein the combination of the plurality of signal level is a third combination that is different from the first combination only in two signal levels when the set position of the conductive member changes from the first set position to a third set position adjacent to the first set position in a rotating direction opposite to the second set position with respect to the first set position, and     wherein when the set position of the conductive member changes from the third set position to the first set position, the mode setter sets at least one of the plurality of modes for a fourth combination and a fifth combination that are different from the first combination and the third combination only in one signal level as the two combinations of the plurality of the signal levels different from all combinations of the plurality of signal levels corresponding to the plurality of modes.

19. The electronic dial apparatus according to claim 18, wherein the mode setter sets one mode set when the conductive member is located at the first set position or the third set position where the combination of the plurality of signal levels is the fourth combination or the fifth combination.

20. An electronic apparatus comprising a dial apparatus, wherein the dial apparatus includes:

a conductive member;

a conductive pattern having a plurality of conductive areas that are electrically insulated from one another, the conductive member being configured to slidably contact the conductive pattern as a relative position between the conductive member and the conductive pattern changes; and     a mode setter configured to set a plurality of modes in accordance with a set position of the conductive member, wherein the mode setter sets one of the plurality of modes based on a combination of a plurality of signal levels that depend on a contact position between the conductive member and the conductive pattern, wherein the mode setter sets two combinations of the plurality of signal levels different from all combinations of the plurality of signal levels corresponding to each set position of the conductive member, wherein the two combinations of the plurality of signal levels appear when the conductive member is located between two specific set positions that are adjacent to each other, and wherein modes which are set in the two combinations are the same mode as one of two modes which are set corresponding to the two specific set positions.

* * * * *